Jan. 7, 1936.  J. C. BACKE  2,026,929
HEATER AND VENTILATOR FOR MOTOR VEHICLES
Filed Jan. 19, 1935   3 Sheets-Sheet 1
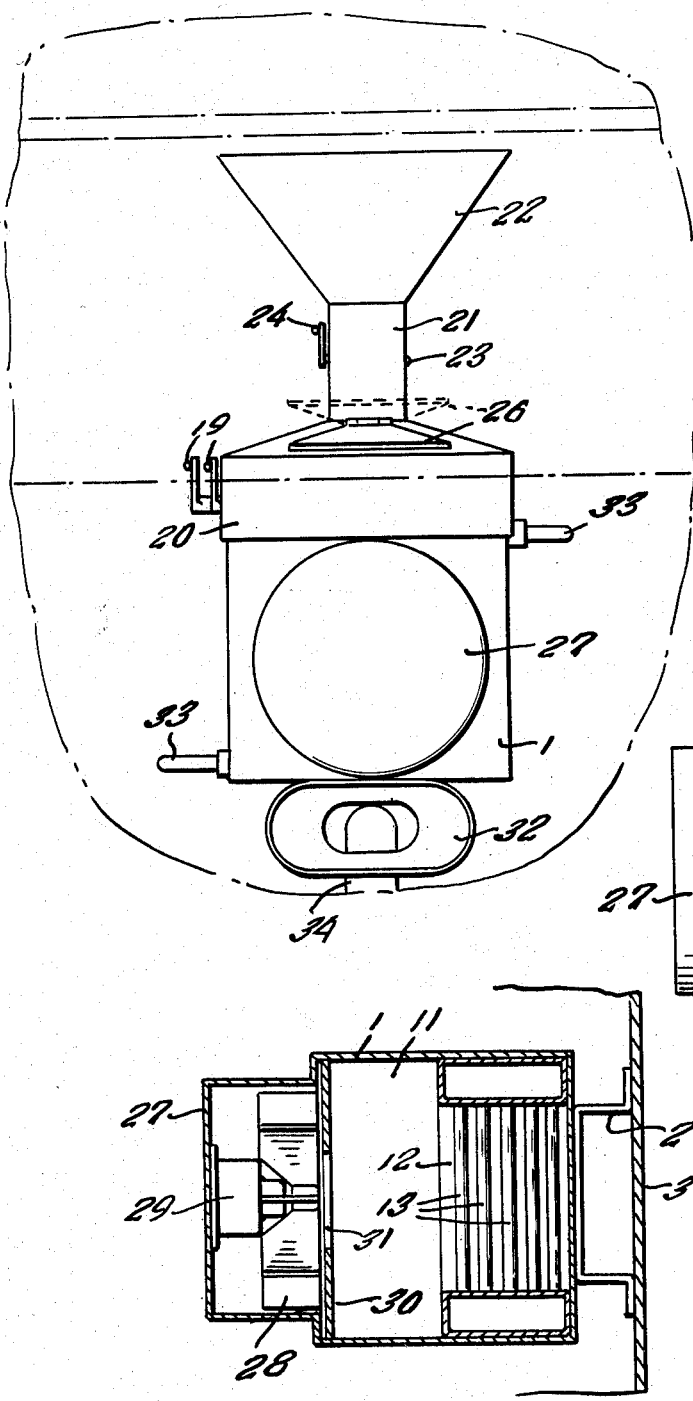
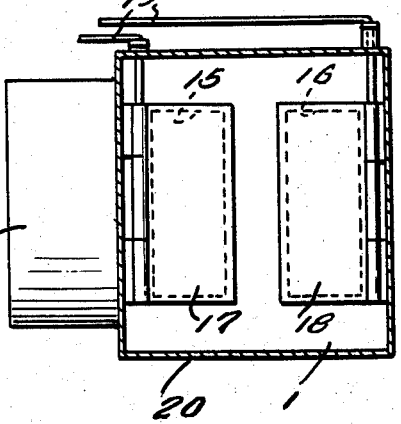
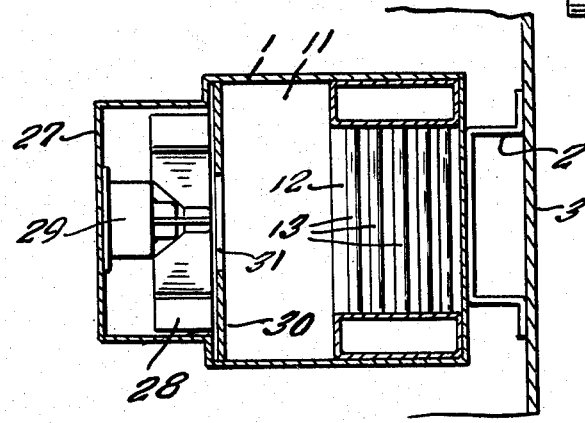
Inventor
John C. Backe
By Clarence A. O'Brien
Attorney

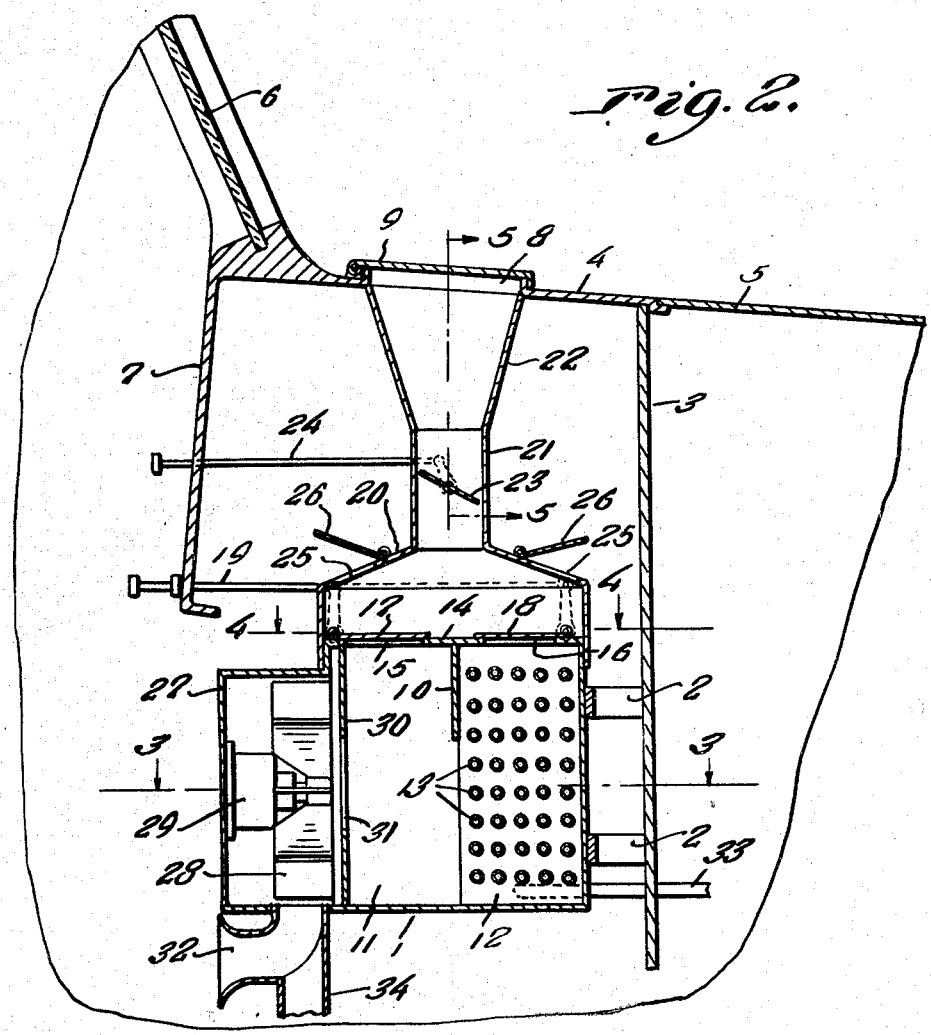
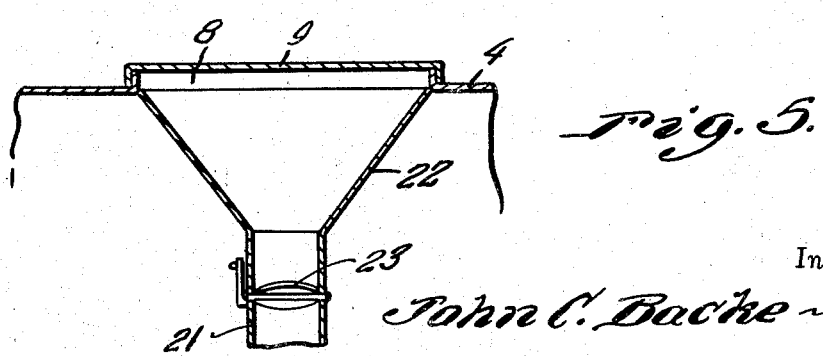

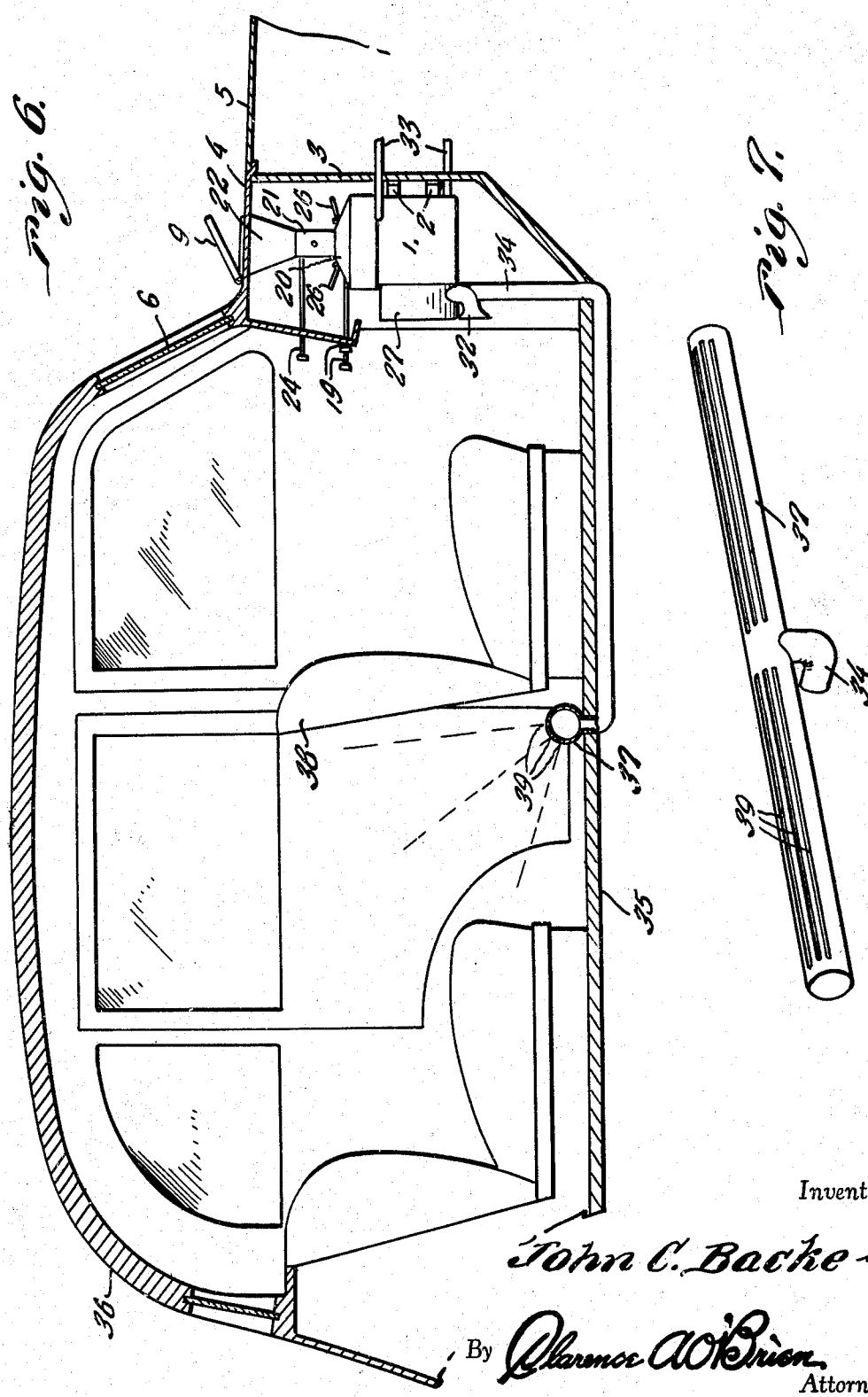

Patented Jan. 7, 1936

2,026,929

UNITED STATES PATENT OFFICE 2,026,929

HEATER AND VENTILATOR FOR MOTOR VEHICLES

John C. Backe, Howell, Mich.

Application January 19, 1935, Serial No. 2,580

3 Claims. (Cl. 98—2)

This invention pertains to new and useful improvements in devices for heating and ventilating automobiles and has for one of its important objects to provide, in a manner as hereinafter set forth, a device of this character comprising a novel construction and arrangement through the medium of which the water in the cooling system of the vehicle engine is utilized as the heating medium.

Another very important object of the invention is to provide an apparatus of the aforementioned character comprising a novel construction and arrangement through the medium of which fresh, heated air from the atmosphere will be introduced into the automobile, the invention further including novel means for regulating or controlling the temperature of said air.

Still another important object of the invention is to provide a heating apparatus for motor vehicles which includes a combination and arrangement of parts whereby the same air may be recirculated if desired.

Other objects of the invention are to provide a heating and ventilating apparatus for automobiles which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in front elevation of an automobile heater and ventilator constructed in accordance with the present invention.

Figure 2 is a view in vertical section through the device.

Figure 3 is a view in horizontal section, taken substantially on the line 3—3 of Figure 2.

Figure 4 is a horizontal sectional view, taken substantially on the line 4—4 of Figure 2.

Figure 5 is a vertical sectional view, taken substantially on the line 5—5 of Figure 2.

Figure 6 is a view in vertical longitudinal section through a portion of an automobile body, showing the means for discharging air into the rear portion of said body.

Figure 7 is a detail view in perspective of the heater which is mounted in the rear portion of the body.

Referring now to the drawings in detail, it will be seen that the embodiment of the invention which has been illustrated comprises a casing 1 of suitable material, preferably metal, which is secured by brackets 2 or the like on the dash board 3 beneath the cowl 4 of the automobile. The reference numeral 5 designates a portion of the usual hood or bonnet of the automobile, 6 designates the automobile windshield beneath which, as usual, is the instrument board or panel 7. The cowl 4 is provided with the usual ventilating opening 8 which is provided with a hinged closure 9.

The casing 1 is provided, in its upper portion, with a partition 10 providing a cold air compartment 11 and an air heating compartment 12 in said casing. Mounted in the compartment 12 is a suitable hot water heater or radiator 13 through which water circulates from the cooling system of the engine (not shown) of the automobile. The top 14 of the casing 1 has formed therein air inlet openings 15 and 16 which are controlled by hinged valves 17 and 18, respectively. The valves 17 and 18 are manually actuated through the medium of rods 19 which extend slidably through the instrument board 7 of the vehicle.

Mounted on the casing 1 is a hood 20 from which an air conduit 21 rises, said conduit 21 including an enlarged or flared upper end portion 22 which is engaged with the cowl ventilator 8 for receiving air from the atmosphere when the closure 9 is in open position. A control valve 23 is mounted in the conduit 21, said control valve being actuated by a rod 24 which also extends slidably through the instrument board 7. Air inlet openings 25 are provided in the hood 20 and controlled by valves 26 which may be retained in set or adjusted position by friction or in any other suitable way. The purpose of the valves 26 will be presently set forth.

Projecting from the front of the casing 1 is a circular extension 27 which provides a housing for a centrifugal fan 28 which is driven by an electric motor 29. A partition 30 is mounted in the compartment 11 adjacent the fan 28, said partition being provided with an opening 31 for the passage of air to said fan. The fan housing 27 is provided with a discharge 32.

In use, when fresh unheated air is desired in the automobile, the closure 9 of the cowl ventilator 8 is opened, and the valves 23 and 17 are also opened. Air then enters the conduit 21 through the cowl ventilator 8, passes downwardly through the hood 20 and into the compartment 11 through the opening 15, then through the opening 31 of the partition 30 into the fan housing 27 from which said air is expelled by the fan 28, as will be readily understood. Of course, the fan 28 draws the air through the device. However, movement of the air from the atmosphere through the device is materially assisted by the forward movement of the vehicle. Should it be desired to introduce only heated air into the automobile, the valve 17 is closed and the valve 18 is opened, the air then passing through the radiator 13 into the compartment 11, then into the fan housing 27 from which it is expelled through the discharge 32. The temperature of the air which is discharged into the automobile may be conveniently regulated as desired by properly adjusting the valves 17 and 18 in a manner to cause a portion of the air entering through the cowl ventilator 8 to pass directly into the chamber 11 and a portion of said air to pass through the radiator 13 and then into the chamber 11 where it is mixed with the unheated air. Should it be desired to recirculate the same air through the heater, the closure 9 of the cowl ventilator 8 is closed or, if desired, the control valve 23 may be closed. The valves 26 are then opened to permit the air from the interior of the automobile to enter the hood 20 from which it passes into either or both of the compartments 11 and 12 of the casing 1. The water pipes which connect the radiator 13 to the cooling system of the automobile engine are designated by the reference numeral 33.

A conduit 34 is connected to the discharge 32 and extends therefrom beneath the floor 35 of the automobile body 36 to a heater 37 which is preferably, but not necessarily, mounted adjacent the front seat 38 of the automobile, as shown to advantage in Figure 6 of the drawings. The heater 37 (see Figure 7) is provided with discharge openings 39 which are preferably in the form of slots.

It is believed that the many advantages of a heater and ventilator for motor vehicles constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A heater and ventilator for motor vehicles comprising a casing, said casing including a cold air compartment and an air heating compartment, means in the second-named compartment for heating the air, said compartments having air inlet openings therein, valves for controlling said openings, a hood mounted on the casing and communicating with the atmosphere, said hood enclosing the valves, and a pump for drawing the air through the casing and discharging said air into the automobile, said compartments communicating with each other.

2. A heating device for motor vehicles having a ventilator, comprising a casing mounted in the vehicle, a hood mounted on said casing, a conduit connecting the hood to the ventilator, said casing including a pair of compartments and further including an extension, said compartments having air inlet openings therein communicating with the hood, valves for controlling the passage of air through said openings, the hood enclosing said valves, means in one of the compartments for heating the air, said compartments communicating with each other, and a pump mounted in the extension for drawing the air from the compartments, said extension having an air discharge opening therein.

3. A heater for motor vehicles comprising a casing including communicating compartments, said compartments having air intake openings therein, means in one of the compartments for heating the air, valves controlling the air intake openings, means for actuating the valves, a hood mounted on the casing and enclosing the valves, said hood having valve controlled air inlet openings therein, a valve controlled air intake conduit communicating with the hood, and a pump mounted in the casing for drawing the air through the compartments when the first-named valves are open.

JOHN C. BACKE.